United States Patent Office 3,160,811
Patented Dec. 8, 1964

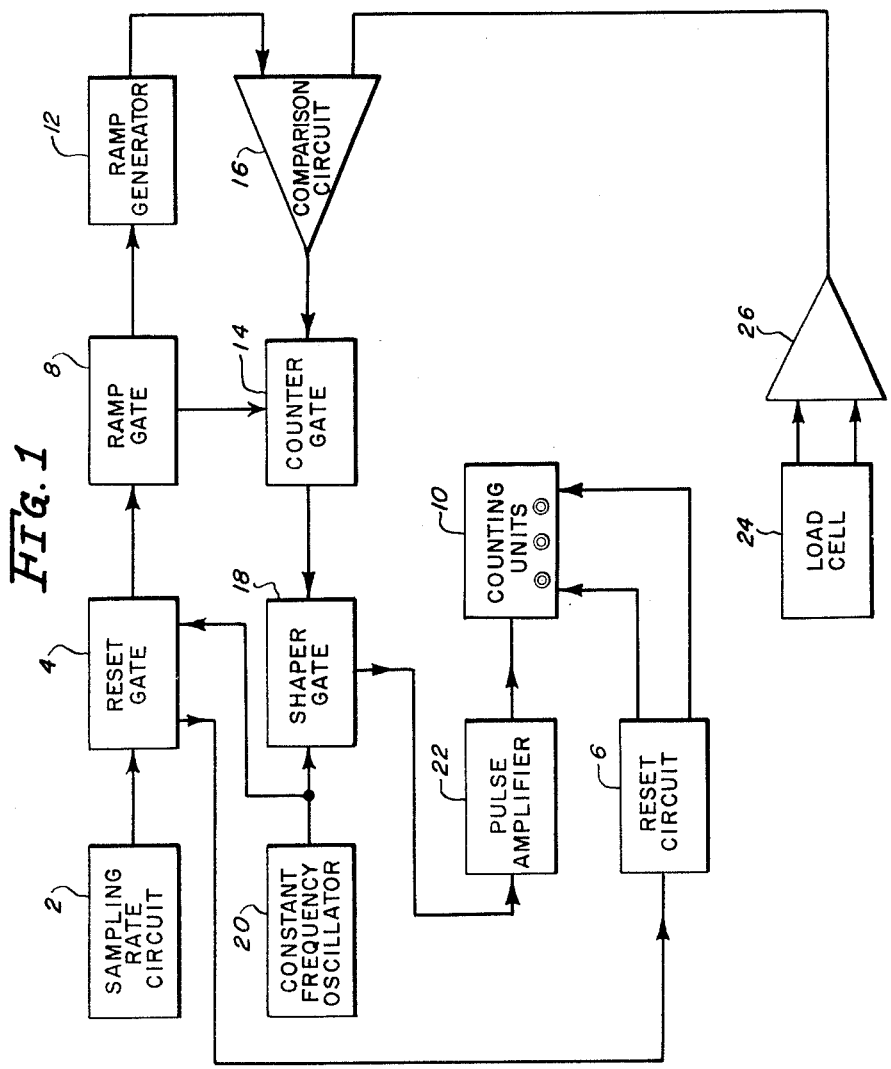

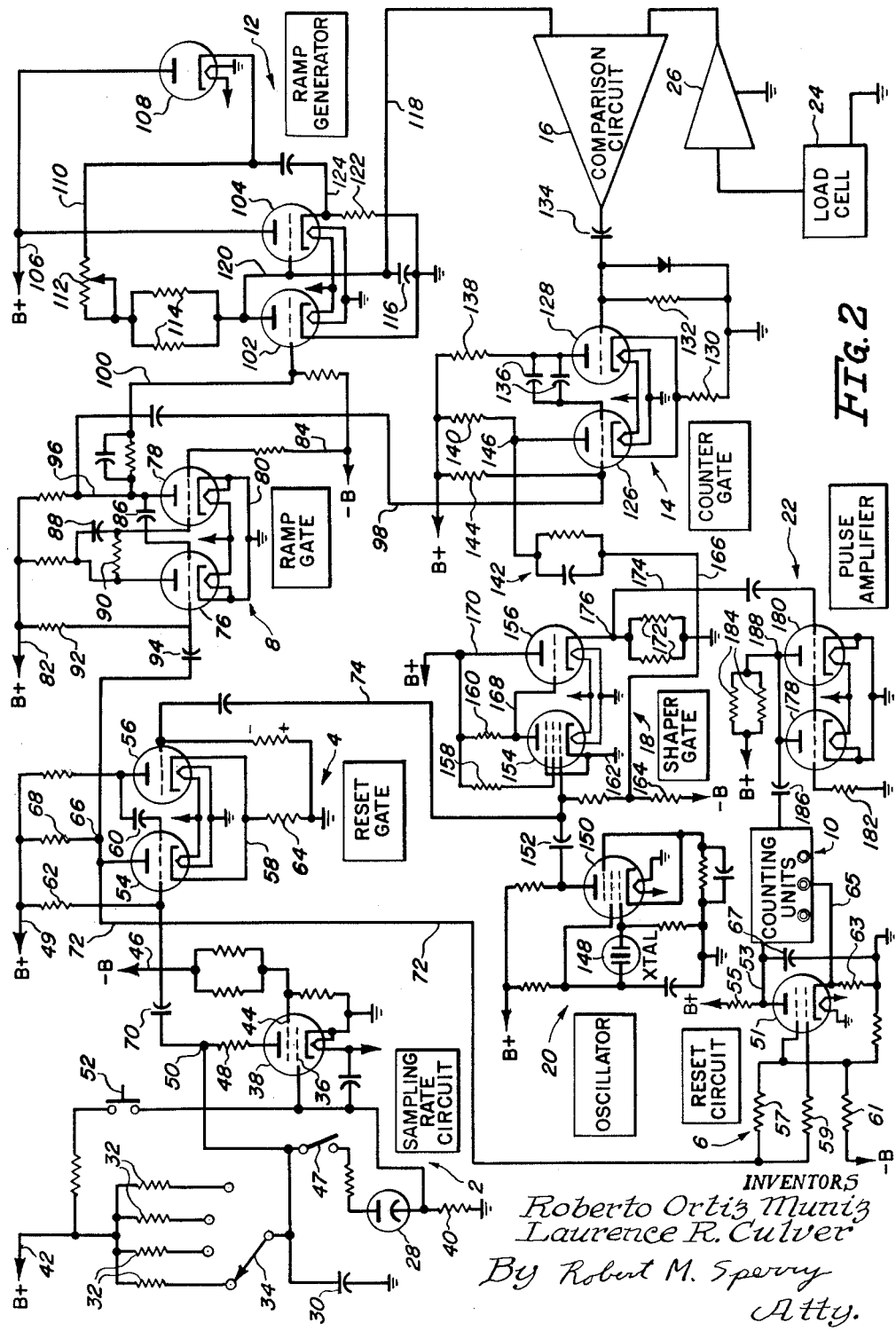

3,160,811
HIGH SPEED WEIGHING SYSTEM USING AN AUTOMATICALLY BALANCED ELECTRICAL CIRCUIT TO PROVIDE A DIGITAL INDICATION
Roberto Ortiz Muniz, Mayaguez, Puerto Rico, and Laurence R. Culver, Melbourne, Fla., assignors, by mesne assignments, to Fairbanks Morse Inc., New York, N.Y., a corporation of Delaware
Filed Mar. 31, 1960, Ser. No. 19,104
3 Claims. (Cl. 324—99)

This invention relates to weighing methods and apparatus and is particularly directed to novel high speed weighing methods and apparatus for providing a substantially instantaneous indication of the weight of articles passing rapidly across the scale platform.

It is frequently necessary or desirable to determine the weight of articles in motion, such as railroad cars moving along a track, trucks traveling along a road, or articles being passed along an assembly line or conveyor system. Moreover, the weighing operation is preferably accomplished without interrupting the movement of such articles.

Numerous types of weighing systems have been proposed heretofore for accomplishing this purpose. However, none of the prior art systems have been entirely satisfactory. Many of the prior art systems have required at least momentary interruption of the motion of the articles to be weighed. Other prior art systems modulate the frequency of an electric signal to vary the number of pulses counted during a given period in accordance with a weight to be measured. However, such systems are subject to possible error as a result of variation in the time interval measuring means or instability of the carrier frequency. Moreover, all of the prior art systems have been relatively slow and inaccurate as compared to the system of the present invention.

These disadvantages of prior art electronic weighing systems are overcome with the present invention wherein a novel electronic weighing system is provided which is demodulated with respect to time whereas the prior art systems are primarily time modulated.

The advantages of the present invention are preferably attained by providing a novel electronic weighing system comprising a first voltage source establishing a voltage which is functionally related to the weight of the article to be weighed, a reference voltage source establishing a linearly increasing reference voltage, a constant frequency oscillator, counting means for counting the cycles of the oscillator output, and means for starting said counting means when the reference voltage starts its rise and for stopping said counting means when the reference voltage is equal to the voltage from said first voltage source.

Accordingly, it is an object of the present invention to provide a novel electronic weighing system.

Another object of the present invention is to provide a novel electronic weighing system which is demodulated with respect to time.

A specific object of the present invention is to provide a novel electronic weighing system comprising a first voltage source establishing a voltage corresponding to the weight of an article to be weighed, a reference voltage source establishing a linearly increasing reference voltage, a constant frequency oscillator, counting means for counting the cycles of the oscillator output, and means for starting said counting means when said reference voltage starts to rise and for stopping said counting means when said reference voltage is equal to the voltage from said first voltage source.

Another specific object of the present invention is to provide a novel method of weighing articles, said method comprising the steps of establishing a first voltage corresponding to the weight of an article to be weighed, establishing a linearly increasing reference voltage, establishing a constant frequency electronic signal, and counting the number of cycles of said signal occurring during the period required for said reference voltage to reach a value equal to that of said first voltage.

These and other objects and features of the present invention will be apparent from the following detailed description taken in connection with the figures of the accompanying drawings.

In the drawings:
FIG. 1 is a block diagram of a typical electronic weighing system embodying the present invention; and
FIG. 2 is a diagrammatic representation of the circuit of the electronic weighing system of FIG. 1.

In that form of the invention chosen for purposes of illustration in the drawings, FIG. 1 shows a typical electronic weighing system embodying the present invention and having a sampling rate circuit 2 which serves to periodically trigger the weighing system to provide a completely automatic system. The sampling rate circuit 2 passes triggering pulses to a reset gate 4 which responds to each triggering pulse by sending a pulse to a reset circuit 6 and, thereafter, sending a pulse to a ramp gate circuit 8. The reset circuit 6 is then energized to reset a plurality of counting units 10 to their zero indication in preparation for the weight indication which is to be supplied to the counting units 10. Meanwhile, the ramp gate circuit 8 passes one pulse to a ramp generator 12 and passes a second pulse, at the same time, to a counter gate circuit 14. Upon receipt of the pulse from the ramp gate circuit 8, the ramp generator 12 begins to deliver a linearly increasing voltage to a suitable comparison circuit 16. At the same time the ramp generator 12 is started, the counter gate 14 applies a pulse to open a shaper gate circuit 18. The shaper gate circuit 18 receives a constant frequency signal from a suitable source, such as oscillator 20, and converts this to a pulse-type signal having a constant repetition rate. The positive portion of this pulse-type signal is passed to a suitable pulse amplifier 22 and is then applied to the counting units 10 to be counted while the negative portion of the oscillator signal is fed back to the reset gate 4 to assure synchronization of the system.

When an article to be weighed is placed on the weight platform, not shown, load cell 24 is provided to establish a voltage having a value functionally related to the weight of the article to be weighed. Various types of suitable load cells for accomplishing this are well known in the scale art. The output of the load cell 24 is amplified by a suitable amplifier 26 and is then applied to the comparison circuit 16 to be compared with the rising voltage from ramp generator 12. The comparison circuit 16 may be of any conventional type which receives and compares two input voltages and emits a pulse when the values of the input voltage are equal.

To briefly review the operation of the system, an article to be weighed is placed on the weigh platform of the scale causing the load cell 24 to establish a voltage functionally related to the weight of the article. This voltage is amplified by amplifier 26 and is applied to the comparison circuit 16. When the sampling rate circuit 2 delivers a starting pulse to the reset gate 4, the reset gate 4 passes a pulse to ramp gate 8 and energizes the reset circuit 6 to reset the counting units 10 to their zero indication. Ramp gate 8 causes the ramp generator 12 to start delivering a linearly rising voltage to the comparison circuit 16 and, simultaneously, passes a pulse to the counter gate 14. Counter gate 14 then activates the shaper gate 18 which receives a constant frequency signal from oscillator 20 and converts it into a pulse type signal having a constant repetition rate. The positive portions of these pulses are passed to a suitable pulse amplifier 22 and are then counted by the counting units 10. Meanwhile, the negative portions of the oscillator signal are fed back to the reset gate 4 to assure synchronization of the system. When the rising voltage from ramp generator 12 reaches a value equal to that of the voltage from the load cell 24, the comparison circuit 16 delivers a pulse to the counter gate 14 which then closes the shaper gate 18. This stops the flow of pulses to the counting units 10.

By selecting the proper amplified voltage output per unit weight on the load cell 24, together with the proper slope of the rising voltage from the ramp generator 12 and the proper frequency of the signal from the oscillator 20, it will be found that the number of pulses counted by the counting units 10 will be equal to the weight of the article being weighed. For example, if the amplified output of load cell 24 is one volt per hundred pounds of weight on the weight platform, and the voltage from the ramp generator 12 rises at a rate of one volt per millisecond, a signal from oscillator 20 of one hundred kilocycles per second will cause the counting units 10 to provide an indication corresponding to the weight of the article being weighed. Thus, if a weight of 658 pounds is placed on the weigh platform, the load cell 24 will produce a voltage which will be amplified to 6.58 volts. The voltage from ramp generator 12 will reach this voltage in 6.58 milliseconds at which time the comparison circuit 16 will emit a pulse to stop the flow of pulses to the counting units 10. However, during the period in which the voltage from ramp generator 12 is rising, the oscillator 20 passed 658 cycles to the shaper gate 18 and these produced 658 pulses which were delivered to the counting units 10. Consequently, when the pulse flow is stopped by the pulse from comparison circuit 16, the counting units 10 will register 658, which is equal to the weight on the weigh platform. Moreover, the weighing operation can be performed at a rate of a hundred times per second and the rate can be increased as hereinafter described.

The counting units 10 are preferably of the type which provide a visual indication of the number of counts received. However, if desired, the weighing system may, either additionally or in the alternative, provide a signal corresponding to the weight of the article being weighed and this signal may be recorded or employed to control suitable apparatus in any of the various manners well known in the art. Moreover, while the ramp generator 12 has been described as delivering a linearly rising voltage, it will be apparent that, when desired, a ramp generator could be employed which would initially deliver a voltage equal to the maximum load of the system and may linearly decrease the voltage delivered to equal the voltage from the load cell. In addition, the system has been described as being triggered by periodic pulses from the sampling rate circuit 2. However, it is obvious that, if desired, the sampling rate circuit 2 could be supplemented with or supplanted by manual, electromechanical or other suitable means for triggering the system.

FIG. 2 illustrates a typical circuit diagram for the weighing system of FIG. 1 and will now be described in considerable detail to more fully illustrate the structure and advantages of the present invention. Title boxes have been added to FIG. 2 to facilitate identification of the various components and to provide a convenient cross reference to the block diagram of FIG. 1.

*Sampling Rate Circuit*

The function of the sampling rate circuit 2 is to automatically trigger the system to initiate the weighing operation and to govern the number of times per second that the weighing operation is to be performed. The sampling rate may be substantially any desired speed. However, sufficient time must be allowed during each weighing cycle for the voltage from the ramp generator 12 to rise to the "full load" value. Moreover, where the weighing system of the present invention is employed with auxiliary equipment, such as a printer or other data recording device, the time required for such auxiliary equipment to perform its function may have a limiting effect.

The actual sampling rate is determined by a relaxation oscillator comprising a neon tube 28 in combination with capacitor 30 and a suitable one of the resistors 32 selected by means of switch 34. The cathode of the neon tube 28 is connected to the control grid 36 of a thyratron 38 and is biased above ground potential by a suitable resistor 40. The thyratron 38 serves to amplify and invert the polarity of pulses produced by neon tube 28. Supply voltage from a suitable source, not shown, is applied to the sampling rate circuit through conductor 42 and thyratron 38 is biased to cut-off by a negative voltage applied to the screen grid 44 from a suitable source, not shown, through conductor 46.

Originally, both neon tube 28 and thyratron 38 are non-conducting. However, the supply voltage causes a charge to build up on capacitor 30 which increases the potential across neon tube 28. When the firing voltage of neon tube 28 is reached, the tube will conduct and current will flow through tube 28 until capacitor 30 is discharged to a value equal to the extinguishing potential of tube 28. The flow of current through neon tube 28 causes a potential drop across resistor 40. Hence, a potential will now appear at grid 36 of the thyratron 38, driving the grid 36 positive and causing the thyratron 38 to conduct. When thyratron 38 conducts, current will flow through resistor 48, thereby lowering the potential at point 50 and delivering a negative pulse to the reset gate 4 to initiate the weighing operation. This negative pulse will continue as long as neon tube 28 is conducting. However, when tube 28 ceases to conduct, grid 36 of thyratron 38 will be returned to ground potential causing thyratron 38 to cease conducting. Each time that neon tube 28 and thyratron 38 are fired, a negative pulse will be applied to initiate a new weighing cycle. Thus, the system will proceed to perform weighing operations automatically at a repetition rate determined by the values of capacitor 30 and the selected resistor 32. Should it be desired to trigger the weighing system manually or mechanically, switches 47 and 52 may be provided. Opening switch 47 prevents automatic operation of the system. Therefore, switch 52 may be operated manually or may be actuated by a treadle or other suitable device and serves to apply positive potential to the grid 36 of thyratron 38 to cause the thyratron 38 to conduct. The thyratron 38 will continue to conduct as long as switch 52 is closed and will cease to conduct when switch 52 is opened.

*Reset Gate*

The reset gate 4 receives the negative pulse from the sampling rate circuit 2 and performs two functions. First, it produces a positive pulse which is passed to reset circuit 6 to reset the counting units 10 to zero in preparation for a new weight indication. Secondly, the reset gate 4 produces a negative pulse which is applied to ramp gate 8 to start the actual weighing operation.

The circuit of the reset gate 4 is a cathode coupled multivibrator circuit employing two triodes 54 and 56 with the cathodes thereof connected together, as seen at 58, and with the control grid of triode 54 coupled to the plate of triode 56, through capacitor 60, and to the supply voltage source, not shown, through resistor 62 and conductor 49. Feedback from triode 56 to triode 54 is provided through the common cathode resistance 64. With this arrangement, triode 54 is normally conducting. Consequently, current flows through triode 54 creating a potential drop across resistor 64. This drives the control grid of triode 56 negative and prevents triode 56 from conducting. Moreover, with triode 54 normally conducting, point 66 is maintained at a potential less than that of the supply voltage, by reason of a suitable resistor 68.

As discussed above, the sampling rate circuit 2 initiates the weighing operation by developing a negative pulse at point 50. Since the control grid of triode 54 is coupled to point 50, through capacitor 70, this negative pulse is applied to the control grid of triode 54 and serves to extinguish triode 54 and capacitor 60 starts to discharge. This cuts off triode 54 which stops the flow of current through triode 54 and immediately raises the potential of point 66 to that of the supply voltage. The rise in potential at point 66 serves as a positive pulse and is supplied, through conductor 72, to the reset circuit 6 to reset the counting units 10 to zero. Furthermore, the cessation of current flow through triode 54 lowers the potential drop across resistor 64 and, consequently, removes the negative bias from the control grid of triode 56. This condition allows triode 56 to conduct while capacitor 60 discharges through resistor 62. When capacitor 60 is discharged, the control grid of triode 54 will no longer be negatively charged. Hence, triode 54 will begin to conduct again while triode 56 will be extinguished. With triode 54 again conducting, the potential of point 66 will again be lowered. This lowering of point 66 serves as a negative pulse to trigger the ramp gate 8 to start the actual weighing operation.

In addition, since the weighing operation of the present invention involves generating pulses at a fixed frequency and then counting the number of pulses occurring while the voltage from the ramp generator 12 is rising to a value equal to that of the voltage from the load cell 24, it will be apparent that the counting units 10 must start counting at precisely the same moment that the voltage from the ramp generator 12 starts to rise. To assure the coincidence of these events, means are provided for synchronizing the pulse supplied to the ramp gate 8 with the first pulse passed by oscillator 20 to the shaper gate 18 to be applied to the counting units 10. As described above, the ramp gate 8 is triggered by the negative pulse created at point 66 of the reset gate 4 when triode 56 is cut off and conduction is renewed through triode 54. Thus, by providing means for driving triode 56 to cut off at the instant that oscillator 20 sends a signal to the shaper gate 18 to be converted to a pulse for counting by the counting units 10, synchronization will be accomplished in a "brute force" manner. To do this, the control grid of triode 56 is coupled by conductor 74 to a point between the shaper gate 18 and oscillator 20. As discussed more fully hereinafter in the description of the oscillator 20, the oscillator applies a negative signal to conductor 74 each time a signal is passed to shaper gate 18 to be concerted to a pulse for counting by the counting units 10. In this way, if triode 56 of the reset gate 4 is not fully cut off at the time that shaper gate 18 passes a pulse to the counting units 10, the negative signal applied by oscillator 20 to conductor 74 will drive triode 56 to complete cut off. This forces the reset gate 4 to deliver the negative pulse to the ramp gate 8 to start the rising voltage from ramp generator 12, in the manner described above, and, thereby, assures synchronous operation of the system.

*Reset Circuit*

The purpose of the reset circuit 6 is to reset the counting units 10 to zero at the start of each weighing operation before they begin to register new information.

The reset circuit 6 comprises a thyratron 51 having the plate thereof connected to the counting units 10 through conductor 53 and supplied with supply voltage from a suitable source, not shown, through resistor 55. The control and screen grids of thyratron 51 are connected to the reset gate 4 through conductor 72 and resistors 57 and 59. Moreover, the screen grid is provided with negative bias from a suitable source, not shown, through resistor 61 while the cathode is maintained above ground potential by a suitable resistor 63 and is connected to the counting units 10 by conductor 65. Also, a capacitor 67 is connected between the plate of thyratron 51 and ground.

In operation, thyratron 51 is normally non-conducting due to the negative bias applied to the screen grid through resistor 61. Under this condition, capacitor 67 is positively charged. When the positive pulse from reset gate 4 is applied to the grid, thyratron 51 becomes conductive. This causes the potential at the plate of thyratron 51 to fall and this reduction in potential is applied through conductor 53 to the counting units 10 to cause the counting units 10 to reset to zero. Meanwhile, the flow of current through thyratron 51 causes a potential drop across cathode resistor 63. This raises the potential at the cathode of thyratron 51 and the rise of potential is applied through conductor 65 to the counting units to clear the previous indication.

When the potential on conductor 53 begins to fall, capacitor 67 begins to discharge and tends to maintain conductor 53 at the high potential. However, capacitor 67 must discharge and, consequently, the potential on conductor 53 falls until it reaches the extinction potential of thyratron 51. Thyratron 51 will then be cut off until a subsequent pulse is received from the reset gate 4.

*Ramp Gate*

The function of the ramp gate 8 is to start the actual weighing operation and, after the voltage from the ramp generator 12 has reached the "full load" value, to shut off the ramp generator 12.

The ramp gate circuit is a cathode coupled multivibrator circuit comprising two triodes 76 and 78 having the cathodes thereof connected together and grounded, as seen at 80. The triodes 76 and 78 are provided with supply voltage from a suitable source, not shown, through conductors 82 and the control grid of triode 78 is negatively biased through conductor 84 from a suitable source, not shown. The control grid of triode 76 is coupled to the plate of triode 78 through capacitor 86 while capacitor 88 and resistor 90 are connected in parallel between the plate of triode 76 and the control grid of triode 78. The control grid of triode 76 is normally maintained positive by the supply voltage source, not shown, through resistor 92. Thus, triode 76 is normally conducting while triode 78 is normally non-conducting. However, the control grid of triode 76 is also coupled to point 66 of the reset gate 4 through capacitor 94. Thus, when the reset gate 4 develops a negative pulse at point 66, as described above, the control grid of triode 76 of the ramp gate 8 will be driven negative and triode 76 will be cut off and capacitor 86 will become charged. When triode 76 is cut off, current will flow through resistor 90 to make the grid of triode 78 go more positive. Therefore, triode 78 will be allowed to conduct. The flow of current through triode 78 lowers the potential at point 96 and this drop in potential appears as a negative pulse on conductor 98. Conductor 98 applies the negative pulse to the counter gate 14 which then opens shaper gate 18 to pass pulses to the counting units 10. Simultaneously, the negative pulse developed at point 96 is delivered to conductor 100 which applies the pulse to ramp generator 12 to start the linearly rising voltage for comparison with the voltage from the load cell 24. While this condition obtains, capacitor 86 is discharging through resistor 92. When the capacitor 86 is sufficiently discharged, the control grid of triode 76 will again become positive and triode 76 will resume conducting. As soon as triode 76 obtains conduction, the potential drop across resistor 90 will be reduced. Thus, the control grid of triode 78 will be driven negative by the biasing voltage applied through conductor 84. Therefore, triode 78 will be cut off. When this occurs, point 96 will return to the potential of the supply voltage. This stops the application of the negative pulse to conductors 98 and 100 and shuts off the ramp generator 12.

It will be apparent that the maximum voltage obtainable by the ramp generator 12 will be determined by the slope of the voltage increase and by the time required for capacitor 86 to discharge. Accordingly, to permit adjustment of the maximum voltage output of the ramp generator 12, the slope of the voltage increase may be maintained constant while the value of capacitor 86 is made variable. In the alternative, the value of capacitor 86 may be fixed and the maximum output or ramp generator 12 may be adjusted by varying those components of the ramp generator 12 which determine the slope of the voltage increase. Obviously, the maximum voltage obtainable by the ramp generator 12 should be at least equal to the maximum voltage which will be delivered by the load cell 24 under full load condition. Moreover, the repetition rate of the sampling rate circuit 2 and, hence, the number of weighing operations which can be performed during a given period, is limited by the length of time required for the ramp generator 12 to reach the "full load" voltage. Accordingly, by increasing the slope of the voltage increase and reducing the time required for discharging capacitor 86, the repetition rate of the system may be substantially any desired figure. Thus, weighing operation may be performed several hundred times per second well within the capabilities of the present invention.

*Ramp Generator*

The function of the ramp generator 12 is to provide an output voltage which increases linearly with respect to time. It is by measuring the time required for this linearly rising voltage to reach a value equal to that of a constant voltage developed by the load cell 24 or the like that the weight of an article on the weigh platform of the scale may be determined.

The circuit of ramp generator 12 includes two triodes 102 and 104. Triode 102 serves as a voltage generator while triode 104 acts as a bootstrap integrator to assure linearity of the output of the ramp generator 12. The cathode of triode 102 is grounded and triode 102 is provided with supply voltage from a suitable source, not shown, through conductor 106, diode 108, conductor 110, potentiometer 112 and parallel resistors 114. A capacitor 116 is connected between the plate of triode 102 and ground. The control grid of triode 102 is energized through conductor 100 and is normally conducting. In this condition, capacitor 116 is shorted to ground and the ramp generator 12 has no output. However, when the ramp gate 8 applies a negative pulse to conductor 100, as described above, the control grid of triode 102 is driven negative and triode 102 becomes non-conducting. As a result, capacitor 116 begins to charge toward the potential of the supply voltage. This increasing voltage appears on conductor 118 and is applied to one input of the comparison circuit 16. However, the capacitor 116 charges exponentially, rather than linearly. As noted previously, triode 104 serves as a bootstrap integrator to provide the desired linearity. The control grid of triode 104 is connected between the plate of triode 102 and capacitor 116, as seen at 120. In addition, the cathode of triode 104 is biased above ground potential by resistor 122 and is connected to conductor 110 by conductor 124.

When triode 102 is conducting, the grid of triode 104 is negative and triode 104 will be cut off. However, when triode 102 cuts off, the capacitor will begin to accumulate charge. As capacitor 116 accumulates charge, the charging current applied to capacitor 116 will be equal to the supply voltage minus the charge on capacitor 116 divided by the resistance of potentiometer 112 and parallel resistors 114. However, as capacitor 116 becomes charged, the grid of triode 104 will become more positive and triode 104 will become increasingly conductive. Moreover, the current through triode 104 will be passed through conductor 124 and will be applied to conductor 110 as a feedback current and will, thus, increase the charging current applied to capacitor 116. If the gain of triode 104 is unity, it will be found that the desired linearity is obtained. This gain can be approximated within satisfactory limits. For example, triode having gains of .95 are commonly available and such triodes provide a maximum deviation from the desired linearity of only .05%. This variation can be tolerted. Hence, the ramp generator 12 provides a linearly increasing output voltage which is supplied through conductor 118 to the comparison circuit 16.

As discussed above in the description of the ramp gate 8, the maximum voltage obtainable by the ramp generator 12 is a function of the time required for capacitor 86 of ramp gate 8 to discharge and the slope of the voltage increase. It was also noted above, that the maximum voltage of the ramp generator 12 could be adjusted by maintaining the voltage increase slope constant and varying the capacitance of capacitor 86 of the ramp gate 8. In the alternative, the maximum voltage obtained by the ramp generator 12 may be adjusted by maintaining the capacitance of capacitor 86 of the ramp gate 8 constant and varying the voltage increase slope. The voltage increase slope is determined by the capacitance of capacitor 116 and the resistance of potentiometer 112 and paralleled resistors 114 together with the value of the supply voltage. Thus, the slope of voltage increase may conveniently be adjusted by varying either the capacitance of capacitor 116 or the resistance of potentiometer 112.

Diode 108 is merely a protective device and is designed to cut off if the ramp generator output voltage approaches the value of the supply voltage. This is merely to protect the circuit components from overloading and is not necessary for the operation of the system.

*Counter Gate*

As discussed above, the weighing operation of the present invention involves measuring the time required for the rising voltage from ramp generator 12 to reach a value equal to that of the constant voltage from the load cell 24. To provide a measurement of this time, counter gate 14 functions to receive a pulse from the ramp gate 8 to open shaper gate 18 to start a flow of pulses at a constant repetition rate to the counting units 10. Subsequently, upon receipt of a signal from comparison circuit 16 indicating coincidence between the values of the rising voltage from ramp generator 12 and the constant voltage from load cell 24, the counter gate 14 acts to halt the flow of pulses to the counting units 10.

It will be seen that the circuit of counter gate 14 is a cathode-coupled multivibrator circuit comprising two triodes 126 and 128 with the cathodes thereof connected together and biased above ground potential by common resistor 130. The grid of triode 128 is connected to ground through resistor 132 and is coupled to the output of comparison circuit 16 through capacitor 134. Also, the plate of triode 128 is coupled to the grid of triode 126 through parallel capacitors 136 and is connected to a suitable supply voltage source, not shown, through resistor 138. The plate of triode 126 is also connected to the supply voltage source, not shown, through resistor 140 and is coupled to the input of shaper gate 18 through the resistance-capacitance circuit 142. In addition, the grid of triode 126 is connected to the supply voltage source, not shown, through resistor 144 and is connected to point 96 of the ramp gate 8 through conductor 98.

At the start of the weighing operation, no signal is applied to either conductor 98 or capacitor 134. Therefore, the grid of triode 126 is positive and triode 126 is conducting. The flow of current through triode 126 establishes a potential drop across resistor 130 which makes the cathode of triode 128 more positive than the grid thereof. Consequently, triode 128 is cut off. When the weighing operation is initiated, ramp gate 8 applies a negative pulse to point 96 to start the ramp generator 12 and, simultaneously, passes the negative pulse through conductor 98 to the counter gate 14. This negative pulse is applied to the grid of triode 126 which extinguishes triode 126 and charges capacitors 136. This lowers the potential drop across resistor 130 which makes the cathode of triode 128 negative with respect to the grid. Consequently, triode 128 begins to conduct. The cessation of current flow through triode 126 raises the potential at point 146 and this rise of potential is applied through resistance-capacitance circuit 142 to the shaper gate 18 to cause the shaper gate 18 to begin passing pulses to be counted by counting units 10. This condition will obtain as long as triode 126 is non-conducting and, in the absence of a signal from comparison circuit 16, this would be determined by the time required for capacitors 136 to discharge.

However, before capacitors 136 have time to fully discharge, the rising voltage from ramp generator 12 will reach a value equal to that of the constant voltage from load cell 24 causing the comparison circuit 16 to apply a negative pulse to the grid of triode 128 through capacitor 134. This negative pulse drives triode 128 to cut off which stops the discharge of capacitors 136 and allows triode 126 to resume conduction. When triode 126 renews conduction, the potential of point 146 is lowered and this removes the positive potential from resistance-capacitance circuit 142 causing shaper gate 18 to stop passing pulses to counting units 10.

Oscillator

Oscillator 20 serves to provide a constant frequency since wave signal which is converted by shaper gate 18 to a pulse type signal having a constant repetition rate and which is then applied for counting by the counting units 10.

As seen in FIG. 2, the oscillator 20 is a conventional Pierce oscillator circuit having a crystal 148 connected between the control grid and screen grid of a pentode 150. The cathode and plate of pentode 150 serve as a load for the oscillator. With this arrangement, a constant frequency sine wave signal is applied through capacitor 152 to the shaper gate 18. It will be apparent that any type of constant frequency oscillator could readily be substituted for the particular oscillator shown. Accordingly, the invention should not be considered as being limited to this form of oscillator.

As indicated heretofore, in the description of the reset gate 4, oscillator 20 also serves to apply synchronizing pulses to reset gate 4 to assure synchronization of the system. Accordingly, it will be noted that the plate of pentode 150 is coupled to the grid of pentode 154 of shaper gate 18 through capacitor 152 and is also coupled through capacitor 152 and conductor 74 to the control grid of triode 56 of reset gate 4. Thus, the sine wave signal from oscillator 20 is continuously being applied to the grid of triode 56 of reset gate 4, as well as to the grid of pentode 154 of shaper gate 18. When triode 56 is non-conducting, the signal from oscillator 20 will have substantially no effect on triode 56. Moreover, when triode 56 is conducting, the positive half cycles of the oscillator signal will merely render triode 56 more conductive which will have little significance. On the other hand, when capacitor 60 of reset gate 4 has nearly completed discharging, so that conduction is about to be returned to triode 54 of reset gate 4, the negative half cycle of the oscillator signal will render triode 56 less conductive. This will accelerate the switching of conduction to triode 54. In this way, the cut off of triode 56 is forced to coincide with the application by oscillator 20 of a negative signal to the grid of pentode 154 of the shaper gate 18. As will be seen in the description of shaper gate 18, this negative signal causes shaper gate 18 to send a pulse to the counting units 10 to be counted. Consequently, synchronization of the system is assured.

Shaper Gate

The purpose of the shaper gate 18 is to receive the constant frequency sine wave signal from the oscillator 20 and to convert it into a pulse type signal having a constant repetition rate. On receipt of a first signal from the counter gate 14, the shaper gate 18 proceeds to pass the pulse type signals to the counting units 10. On receipt of a second signal from counter gate 14, the shaper gate 18 stops the flow of pulses to the counting units 10.

The shaper gate 18 includes pentode 154 and triode 156. The screen grid and plate of pentode 154 are connected to the supply voltage source, not shown, through respective resistors 158 and 160 while the cathode and suppressor grid of pentode 154 are grounded, as seen at 162. In addition, the grid of pentode 154 is connected to a suitable negative biasing source, not shown, through resistor 164 and is connected through conductor 166 to the resistance-capacitance circuit 142 of counter gate 14. The grid of pentode 154 is also coupled to the grid of triode 56 of reset gate 4 through conductor 74 and is coupled to the output of oscillator 20 through capacitor 152 while the plate of pentode 154 is connected by conductor 168 to the grid of triode 156. The plate of triode 156 is connected to the supply voltage source, not shown, through conductor 170 while the cathode of triode 156 is biased above ground potential by parallel resistors 172 and is connected by conductor 174 to the pulse amplifier 22.

In operation, pentode 154 is normally non-conducting due to the negative bias on the grid thereof. As a result, the plate of pentode 154 will be at the supply potential and the grid of the triode 156 will be positive. Thus, triode 156 will be conducting. At the start of the weighing operation, the sine wave signal from oscillator 20 is insufficient to cause pentode 154 to conduct. Hence, no pulses are passed to the counting units 10. However, when the weighing operation is initiated, counter gate 14 applies a positive potential to the resistance-capacitance circuit 142, as heretofore described. This positive potential is passed through conductor 166 to the grid of pentode 154 and is sufficient to make the grid of pentode 154 slightly positive. Moreover, the sine wave signal from oscillator 20 is simultaneously being applied to the grid of pentode 154. As a result, the grid of pentode 154 is driven highly positive during positive half cycles of the oscillator signal but is driven negative during the negative half cycle of the oscillator signal. Consequently, pentode 154 is highly conductive during the positive half cycles of the oscillator signal and is cut off during the negative half cycles of the oscillator signal. When pentode 154 is conducting, the potential of its plate and, through conductor 168, the potential of the grid of triode 156 will be substantially reduced. On the other hand, when pentode 154 ceases to conduct, the potential of its plate and of the grid of triode 156 will be increased. Thus, the current flow through triode 156 will be low when pentode 154 is conducting whereas the current through triode 156 will be high when pentode 154 is cut off. When the current flow through triode 156 is increased, the potential drop across resistors 172 will be increased. This raises the potential of point 176 and the rise in potential appears on conductor 174 as a positive pulse which is applied by conductor 174 to the input of pulse amplifier 22. Similarly, when the current flow through triode 156 is reduced, the potential drop across resistors 172 will be reduced, causing a negative pulse to be applied through conductor 174 to the input of pulse amplifier 22 and, through it, to counting units 10.

When comparison circuit 16 emits a pulse signifying coincidence between the voltages from ramp generator 12 and load cell 24, the positive potential applied to the grid of pentode 154 by the counter gate 14 will be removed. Accordingly, pentode 154 will cease to be driven by the signal from oscillator 20 and, due to the negative bias of a its grid, will be cut off. Therefore, the current flow through triode 156 will cease to be pulsed and no additional pulses will be applied to pulse amplifier 22. Thus, no further counting will be done by counting units 10.

*Pulse Amplifier*

The pulse amplifier 22 serves to receive positive pulses from the shaper gate 18 and to apply them as amplified negative pulses to the counting unit 10 to cause the counting units to indicate the number of pulses received while the voltage ramp generator 12 was rising to the value of the voltage from load cell 24 and, hence, to indicate the weight of the article on the weigh platform of the scale.

The circuit of pulse amplifier 22 is a parallel triode circuit having two triodes 178 and 180 each having their cathodes, grids and plates coupled to the corresponding electrode of the other. The cathodes are grounded while the grids are biased above ground by resistor 182. Supply voltage is applied from a suitable source, not shown, through parallel resistors 184. Moreover, the grids of triodes 178 and 180 are connected to the shaper gate 18 through conductor 174 while the plates are coupled to counting units 10 through capacitor 186.

In operation, triodes 178 and 180 are both normally conducting. However, upon receipt of a positive pulse from shaper gate 18 through conductor 174, the grids are driven more positive, causing the tubes to conduct more heavily, as a result, the potential at point 188 is reduced and appears as a negative pulse across capacitor 186. This negative pulse is received by the counting units 10 and is registered as a "count." Upon cessation of the positive pulse from shaper gate 18, conduction through triodes 178 and 180 returns to normal and the potential at point 188 is raised pending receipt of a subsequent pulse to be counted.

The counting units 10, comparison circuit 16, load cell 24 and load cell amplifier 26 are conventional items available commercially and are only of interest in the present invention in combination with the other components of the system. It will be apparent that any similar commercial items having suitable characteristics may be employed.

Moreover, while the system of the present invention has been described as an electronic weighing system, it will be apparent that the system may be employed for measuring or indicating substantially any information which can be presented by a constant voltage having a value corresponding to the information to be displayed. Thus, for example, load cell 24 could be replaced by a thermostat or pressure responsive device having an output voltage corresponding to the temperature or pressure to be measured.

In addition, numerous other variations and modifications may obviously be made without departing from the invention. Accordingly, it should be clearly understood that the form of the invention described above and shown in the figures of the accompanying drawings is illustrative only and is not intended to limit the scope of the invention.

What is claimed is:

1. An electronic high speed weighing system comprising a first voltage source for establishing a voltage functionally related to the weight of an article to be weighed, voltage generating means for generating a linearly increasing reference voltage, means for providing constant frequency signals, a counting and indicating system including counting means connected to receive said constant frequency signals, counter gating means connected to control the flow of said constant frequency signals to said counting means, sampling means to provide a sampling pulse to initiate the operation of said weighing system, reset gate means having plural output terminals connected to said sampling means, said reset gate means operating upon the reception of a sampling pulse from said sampling means to provide a first output pulse at one of said plural output terminals, and subsequent thereto, a second output pulse at another of said output terminals, a reset unit connected to receive the first output pulse from said reset gate means, said reset unit operating upon the reception of said first output pulse to provide a signal to zero said counting means, ramp gate means connected to receive said second output pulse from said reset gate means subsequent to the resetting of said counter means, said ramp gate means operating to simultaneously provide a trigger pulse to said voltage generating means and said counter gate means, said trigger pulse simultaneously causing said counter gate means to open and permit the passage of constant frequency signals to said counter means and said voltage generating means to generate a linearly increasing reference voltage, and comparison means connected to receive and compare said linearly increasing reference voltage and said voltage from said first voltage source, said comparison means directing a signal to close said counter gate means when said reference voltage reaches a level equal to that of the voltage from said first voltage source.

2. The electronic high speed weighing system of claim 1 which includes means connecting said reset gate means to receive the constant frequency signals from said means for providing constant frequency signals whereby said second output pulse from said reset gate means is synchronized with the first of such constant frequency signals received by said counter means.

3. The electronic high speed weighing system of claim 1 wherein said reset gate means includes a cathode-coupled multivibrator circuit having a first normally conductive electronic valve means, second electronic valve means coupled to said first electronic valve means to be rendered conductive upon the nonconduction of said first electronic valve means, means connecting said first electronic valve means to receive the sampling pulse from said sampling means, said sampling pulse rendering said first electronic valve means nonconductive and said second electronic valve means conductive, whereby a first output pulse is provided at one of said plural output terminals of said reset gate means, means connected between said first and second electronic valve means to return said second electronic valve means to the nonconductive condition subsequent to the reception of said sampling pulse whereby a second output pulse is provided at a second output terminal of said reset gate means, and means connecting said reset gate means to receive the constant frequency signals from said means for providing constant frequency signals, whereby said second output pulse from said reset gate means is synchronized with the first of such constant frequency signals received by said counter means.

References Cited by the Examiner

UNITED STATES PATENTS

| | | | |
|---|---|---|---|
| 2,560,124 | 7/51 | Mofenson | 340—347.1 |
| 2,717,994 | 9/55 | Dickinson et al. | 340—347 |
| 2,733,358 | 1/56 | Carapellotti | 340—347.1 |
| 2,787,418 | 4/57 | MacKnight et al. | 340—347 |
| 2,819,054 | 1/58 | Thorsson | 177—211 |
| 2,840,806 | 6/58 | Bateman | 340—347 |
| 2,870,436 | 1/59 | Kuder | 324—99 |
| 2,872,670 | 2/59 | Dickinson | 340—347 |

WALTER L. CARLSON, *Primary Examiner.*

ISAAC LISANN, FREDERICK M. STRADER,
*Examiners.*